Patented Sept. 23, 1952

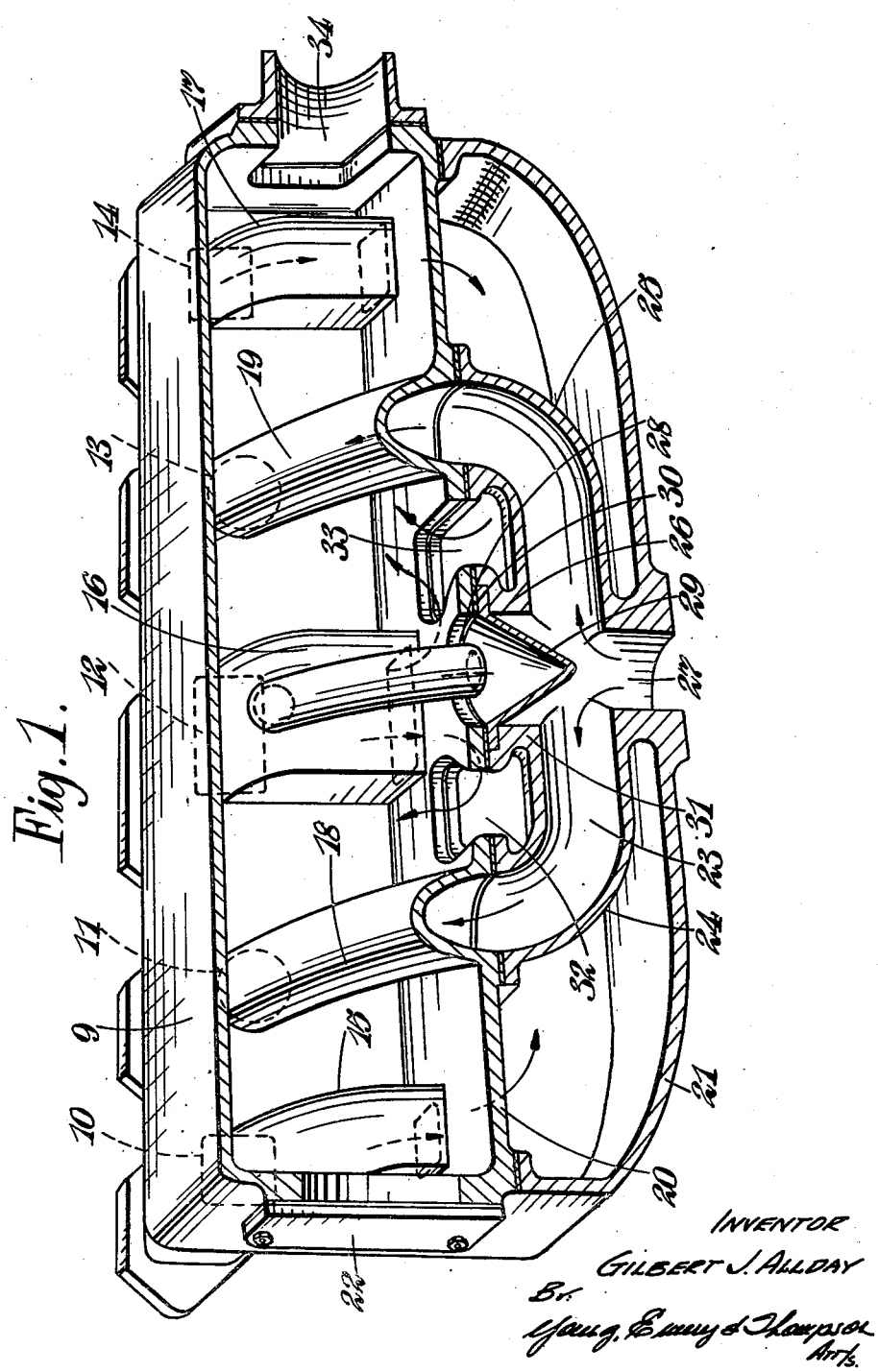

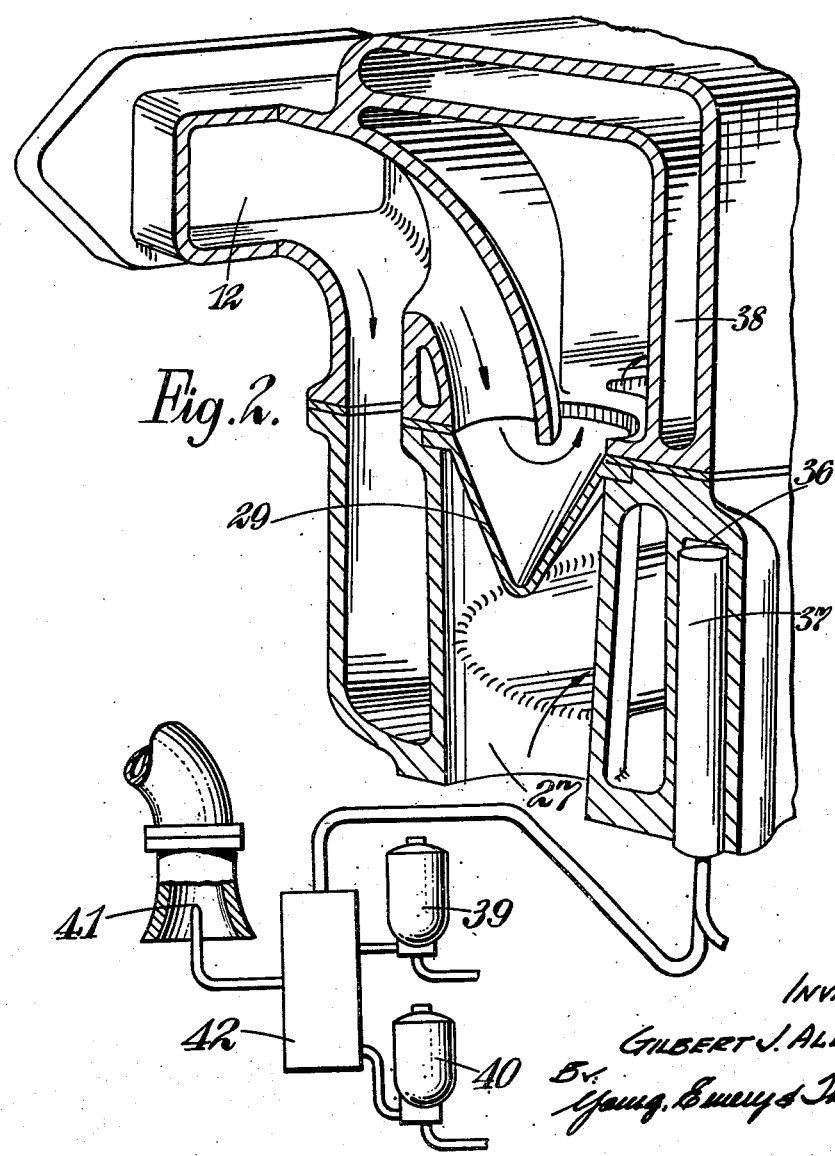

2,611,353

UNITED STATES PATENT OFFICE 2,611,353

EXHAUST AND INDUCTION SYSTEM FOR INTERNAL-COMBUSTION ENGINES

Gilbert James Allday, Weybridge, England

Application June 16, 1949, Serial No. 99,564
In Great Britain May 11, 1949

8 Claims. (Cl. 123—127)

This invention relates to exhaust and induction systems for internal combustion engines of the kind in which the exhaust gases are arranged to heat the combustible gases by means of a heat exchanger.

According to this invention, an exhaust and induction system of the kind referred to for an internal combustion engine is characterised in that the heat exchanger comprises two intercommunicating closed compartments, conduits leading from the exhaust valves of the engine extending through one compartment and opening into a second compartment whence they pass into the first said compartment and finally to exhaust, and an induction pipe located in the second compartment and communicating with conduits extending through the first compartment and leading to the inlet valves.

An important feature of the invention consists in that an exhaust conduit opens directly into the first said compartment and is directed into a hollow projection which extends into the induction pipe within the second compartment. The hollow projection may be conical in form and may be arranged immediately opposite the location where the gases enter into the induction pipe.

The intercommunication between the two compartments may be by way of ports formed in a dividing wall between them.

The invention is particularly applicable to an engine in which the inlet and exhaust passages from the cylinders terminate at ports in the side face of the cylinder head block, in which case a back wall of the first said compartment is provided with a set of ports in register with the ports in the cylinder head and communicating respectively with the inlet and exhaust conduits which extend through that compartment.

The two compartments may be constructed to form a unit, for example, they may be separately formed and then secured together.

The walls of the compartments may be water jacketed. In the case where a thermostatically controlled bi-fuel carburettor is employed such as described in application No. 15,193/48 the heat responsive element of the thermostat may be disposed in a cavity formed in a wall of one of the chambers, for example, in the second chamber.

The following is a description of the invention as applied to a four-cylinder internal combustion engine reference being made to the accompanying drawing in which:

Figure 1 is a perspective sectional elevation and

Figure 2 is a perspective section through the centre of Figure 1.

The arrangement is suitable for use with an engine in which the exhaust passages in the cylinder head for number two and three cylinders join one another at a port centrally disposed, while the exhaust passages of number one and four cylinders are arranged at the ends of the block.

The inlet passages in the cylinder head block for number one and two cylinders join one another at a port in the side of the cylinder head block at a position between two of the exhaust ports, while the passages for number three and four cylinder join at a port located between the other two exhaust ports.

A similarly disposed set of ports, 10, 11, 12, 13, 14 are arranged in the back wall of an upper compartment 9 and associated with these ports are three exhaust conduits 15, 16 and 17 and two inlet conduits 18, 19, which extend through the upper compartment and communicate with ports in the bottom wall 20 thereof. A lower compartment 21 is secured by bolts to the upper compartment and is formed with an induction pipe 23 having two upwardly extending branches 24, 25, which communicate with two ports associated with the inlet conduits 18 and 19. Upwardly and downwardly extending passages 26 and 27 are formed at the centre of the induction pipe, the latter communicating with a carburetor and the former arranged below a port 28 in the bottom wall 20 of the upper compartment but obscured from that part by a conical wall 29 having a flange 30 which is gripped between said bottom wall 20 and a flange 31 on the induction pipe. The conical wall projects into the induction pipe immediately above the passage 27 and forms a hit spot for the inflowing gases. An exhaust pipe 35 leads from the conduit 16 and is directed into the conical wall 29.

Intercommunicating ports 32 and 33 between the two compartments are arranged in the bottom wall 20 of the upper compartment between the centre exhaust conduit 16 and the two induction conduits 18 and 19 on either side of it. Thus the exhaust gases pass downwardly through the conduits 15, 16 and 17 into the lower compartment 21 and then upwardly through said ports 32, 33 into the upper compartment and thence to the exhaust passage 34. Provision is made for attaching the exhaust pipe at either the front or rear end, the opposite end being blanked off by a suitable plate 22.

As indicated above a cavity 36 (see Figure 2) for the heat responsive element 37 of a thermostat is provided in a wall of the lower compartment. The thermostat controls a valve mechanism 42 of a bi-fuel carburetor shown diagrammatically as comprising two float chambers 39, 40, from either of which fuel flows to a jet 41 in the induction system according to the setting of the valve mechanisms under the control of the thermostat.

As indicated in Figure 2, the walls of the upper compartment may be provided with a water jacket 38.

I claim:

1. An exhaust and induction system for an internal combustion engine comprising two closed compartments having a dividing wall between them with openings therein, exhaust conduits and induction conduits extending through one of said compartments, which exhaust conduits open into the second compartment and an exhaust outlet communicating with the first said compartment, and an induction manifold in the second compartment having branch passages communicating with said inlet conduits in the first said compartment.

2. An exhaust and induction system for an internal combustion engine comprising two closed compartments having a dividing wall between them with openings therein, exhaust conduits and induction conduits extending through one compartment which exhaust conduits open into the second compartment, an exhaust outlet communicating with the first said compartment, an induction manifold in the second compartment having branch passages communicating with said inlet conduits in the first said compartment, a hollow projection on said dividing wall extending into a part of the induction manifold, and an additional exhaust conduit opening directly into the first compartment opposite the hollow projection.

3. An exhaust and induction system for an internal combustion engine comprising two closed compartments having a dividing wall between them with openings therein, exhaust conduits and induction conduits extending through one compartment, which exhaust conduits open into the second compartment and exhaust outlet communicating with the first said compartment, an induction manifold in the second compartment having an inlet extending through a wall of that compartment and having branch passages communicating with said inlet conduits in the first said compartment, a hollow conical projection extending from the dividing wall into the induction manifold opposite said inlet, and an additional exhaust conduit opening directly into the first said compartment and directed into the hollow conical projection.

4. An exhaust and induction system for an internal combustion engine comprising two closed compartments having a dividing wall between them with openings therein, exhaust conduits and induction conduits extending through that compartment from an upright wall thereof, which exhaust conduits open into the second compartment and an exhaust outlet in another wall of the first said compartment, and an induction manifold in the second compartment, having branch passages communicating with said inlet conduits in the first said compartment.

5. An exhaust and induction system for an internal combustion engine comprising two closed compartments constructed as a unit and having a dividing wall between them with openings therein, exhaust conduits and induction conduits extending through one of said compartments, which exhaust conduits open into the second compartment and an exhaust outlet communicating with the first said compartment, and an induction manifold in the second compartment having branch passages communicating with said inlet conduits in the first said compartment.

6. An exhaust and induction system for an internal combustion engine comprising two separately formed closed compartments secured together as a unit and having a dividing wall between them with openings therein, exhaust conduits and induction conduits extending through one of said compartments, which exhaust conduits open into the second compartment and an exhaust outlet communicating with the first said compartment, and an induction manifold in the second compartment having branch passages communicating with said inlet conduits in the first said compartment.

7. An exhaust and induction system for an internal combustion engine comprising two closed compartments at least one of which is water jacketed, a dividing wall between the compartments with openings therein, exhaust conduits and induction conduits extending through one of said compartments, which exhaust conduits open into the second compartment and an exhaust outlet communicating with the first said compartment, and an induction manifold in the second compartment having branch passages communicating with said inlet conduits in the first said compartment.

8. An exhaust and induction system for an internal combustion engine comprising two closed compartments at least one of which is water jacketed, a dividing wall between the compartments with openings therein, exhaust conduits and induction conduits extending through one of said compartments, which exhaust conduits open into the second compartment and an exhaust outlet communicating with the first said compartment, an induction manifold in the second compartment having branch passages communicating with said inlet conduits in the first said compartment, and a heat responsive element of a thermostat disposed in said water jacket space and adapted to control valve mechanism of a bi-fuel carburettor associated with the induction system.

GILBERT JAMES ALLDAY.

REFERENCES CITED

The following references are of record in the file of this patent:

UNITED STATES PATENTS

| Number | Name | Date |
|---|---|---|
| 1,160,438 | Neuteboom et al. | Nov. 16, 1915 |
| 1,439,146 | Chadwick | Dec. 19, 1922 |
| 1,953,888 | Moore | Apr. 3, 1934 |